United States Patent
Uraizee et al.

(10) Patent No.: US 9,985,914 B2
(45) Date of Patent: May 29, 2018

(54) RICH ATTACHMENT REGENERATION

(71) Applicant: MICROSOFT TECHNOLOGY LICENSING, LLC, Redmond, WA (US)

(72) Inventors: Misbah Uraizee, Bellevue, WA (US); George Arthur Herbert, III, Kirkland, WA (US); Aaron Stolarz, Redmond, WA (US); William Baughman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 122 days.

(21) Appl. No.: 14/846,963

(22) Filed: Sep. 7, 2015

(65) Prior Publication Data

US 2016/0315889 A1 Oct. 27, 2016

Related U.S. Application Data

(60) Provisional application No. 62/151,861, filed on Apr. 23, 2015.

(51) Int. Cl.
*G06F 15/16* (2006.01)
*H04L 12/58* (2006.01)
(Continued)

(52) U.S. Cl.
CPC ........ *H04L 51/08* (2013.01); *G06F 17/30887* (2013.01); *G06Q 10/107* (2013.01);
(Continued)

(58) Field of Classification Search
CPC ......... H04L 51/08; H04L 51/22; H04L 51/32; H04L 12/58; H04L 51/10; H04L 61/307;
(Continued)

(56) References Cited

U.S. PATENT DOCUMENTS 5,903,723 A 5/1999 Beck et al.
7,054,905 B1 5/2006 Hanna et al.
(Continued)

FOREIGN PATENT DOCUMENTS

WO 2003005276 A2 1/2003

OTHER PUBLICATIONS

"Second Written Opinion Issued in PCT Application No. PCT/US2016/028726", dated Mar. 3, 2017, 7 Pages.
(Continued)

*Primary Examiner* — Hitesh Patel
(74) *Attorney, Agent, or Firm* — Turk IP Law, LLC (57) ABSTRACT

Rich attachments in emails (or other modes of communication) may be regenerated when an email with a rich attachment is sent to an application incapable of handling the rich attachment and then returned or forwarded to an application capable of handling the rich attachments. In some examples, the rich attachment may be along with a link (e.g., a hypertext markup language "HTML" link) or similar construct by the application capable of handling the rich attachment. A receiving/forwarding (or replying) application that is incapable of handling the rich attachment features, may simply keep the link in the email without processing the rich features. When the email comes back or is forwarded to the application capable of handling the rich attachment, the HTML link may be recognized, the attachment and associated metadata extracted, and presented to the recipient as rich attachment (e.g., in an attachment well).

16 Claims, 6 Drawing Sheets

(51) Int. Cl.
 G06Q 10/10 (2012.01)
 G06F 17/30 (2006.01)
(52) U.S. Cl.
 CPC ............ H04L 51/063 (2013.01); H04L 51/10 (2013.01); H04L 51/16 (2013.01); H04L 51/18 (2013.01)
(58) Field of Classification Search
 CPC ......... G06F 17/30882; G06F 17/30011; G06F 17/30876; H04M 1/72552; H04N 21/4786
 See application file for complete search history.

(56) References Cited

U.S. PATENT DOCUMENTS

| | | | |
|---|---|---|---|
| 7,194,514 B1 | 3/2007 | Yen et al. | |
| 7,814,425 B1 | 10/2010 | O'Shaugnessy et al. | |
| 8,185,591 B1 | 5/2012 | Lewis | |
| 2002/0059384 A1 | 5/2002 | Kaars | |
| 2002/0198944 A1* | 12/2002 | Moss | H04L 12/1886 709/206 |
| 2003/0055907 A1 | 3/2003 | Stiers | |
| 2012/0124143 A1* | 5/2012 | Chung | G06Q 10/107 709/206 |
| 2012/0198003 A1* | 8/2012 | Schechter | H04L 51/34 709/206 |
| 2012/0226760 A1 | 9/2012 | Lewis | |
| 2012/0278405 A1 | 11/2012 | Costenaro et al. | |
| 2012/0278407 A1 | 11/2012 | Meisels et al. | |
| 2015/0200885 A1* | 7/2015 | Sharp | H04L 51/08 709/206 |
| 2016/0099896 A1* | 4/2016 | Huang | H04L 63/083 709/206 |

OTHER PUBLICATIONS

"International Search Report and Written Opinion Issued in PCT Application No. PCT/US2016/028726", dated Jun. 30, 2016, 11 Pages.

"Outlook Attachment Sniffer", Published on: Apr. 10, 2012, Available at: http://www.rsbr.de/Software/OASniffer/index.htm.

"Single Instance Attachment Storage in ConnectXf", Published on: Sep. 8, 2013, Available at: https://www.mithi.com/product-attachmentstripping.

"Attachment Save Add-In for Microsoft Outlook", Retrieved on: Apr. 16, 2015, Available at: http://www.sperrysoftware.com/outlook/attachment-save.asp.

Bellotti, et al., "Innovation in Extremis: Evolving an Application for the Critical Work of Email and Information Management", In Proceedings of the 4th conference on Designing interactive systems: processes, practices, methods, and techniques, Jun. 25, 2002, pp. 181-192.

West, Casey, "Email-MIME-Attachment-Stripper-1.317", Published on: Jan. 31, 2009, Available at: http://search.cpan.org/~rjbs/Email-MIME-Attachment-Stripper-1.316/lib/Email/MIME/Attachment/Stripper.pm.

"International Preliminary Report on Patentability Issued in PCT Application No. PCT/US2016/028726", dated Jul. 5, 2017, 8 Pages.

* cited by examiner

RICH ATTACHMENT REGENERATION

CROSS-REFERENCE TO RELATED APPLICATIONS

This application claims the benefit under 35 U.S.C. § 119(e) of U.S. Provisional Patent Application Ser. No. 62/151,861 filed on Apr. 23, 2015. The disclosure of the U.S. Provisional patent application is hereby incorporated by reference in its entirety.

BACKGROUND

Some communication applications such as email applications may provide rich attachment capabilities, where physical or cloud-based attachments can be sent/displayed along with metadata that may be live. When an email is sent from a communication service with rich attachment capabilities to another communication service without rich attachment capabilities that cannot handle the rich attachment features, the attachment may be brought into the email body as an HTML link. When the same message is subsequently sent to an account at the rich attachment capable communication service from the other communication service without rich attachment capabilities, the attachment is typically presented still in HTML link form unable to take advantage of the rich attachment capabilities of original communication service.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to regeneration of rich attachments in communications such as an email. An email arriving from a server without rich attachment capabilities may be detected and a link to an attachment extracted from a body of the detected email. Metadata associated with the attachment may be retrieved and the attachment regenerated with rich attachment attributes based on the retrieved metadata.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, rich attachments in emails (or other modes of communication) may be regenerated when an email with a rich attachment is sent to an application incapable of handling the rich attachment and then returned or forwarded to an application capable of handling the rich attachments. In some examples, the rich attachment may be along with a link (e.g., a hypertext markup language "HTML" link) or similar construct by the application capable of handling the rich attachment. A receiving/forwarding (or replying) application that is incapable of handling the rich attachment features, may simply keep the link in the email without processing the rich features. When the email comes back or is forwarded to the application capable of handling the rich attachment, the HTML link may be recognized, the attachment and associated metadata extracted, and presented to the recipient as rich attachment (e.g., in an attachment well).

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing communication services including emails and exchange of attachments. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

While example implementations are described using emails herein, embodiments are not limited to emails. Rich attachment regeneration may be implemented in other communication types such as instant messages, data sharing, application sharing, online conferencing, and similar communications, where files or objects may be exchanged as attachment with the communication.

A rich attachment as used herein refers to any file or object that is included with a communication such as an email, where the file or object may be attached as a separate entity to the communication, inserted into a body of the communication as a file or object, or provided along with the communication as a link to the file or object. The attachment may include features such as interactivity, preview, presence, dynamic content update, and other non-static capabilities. In some cases, the attachment may include metadata, which may be displayed by the application capable of handling rich attachment features. A native server as used herein refers to a server that is part of a communication service capable of processing communications with rich attachments and presenting the "rich" capabilities of the attachments to a user. In contrast, a non-native server may provide communication services similar to a native server, but may not be capable of recognizing or processing the rich capabilities of attachments. In some examples, non-native servers may convert rich attachments to simpler constructs such as a link or a static object.

The technical advantages of providing links along with rich attachments and regeneration of rich attachments in emails may include increased efficiency in network usage (reduced communication traffic), reduced data storage demand (reduction of copies of attachments), improved user efficiency (availability of attachments with rich attachment attributes even from communication services without the capability), and improved user interaction with user interfaces.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with attachments.

Figure 1:
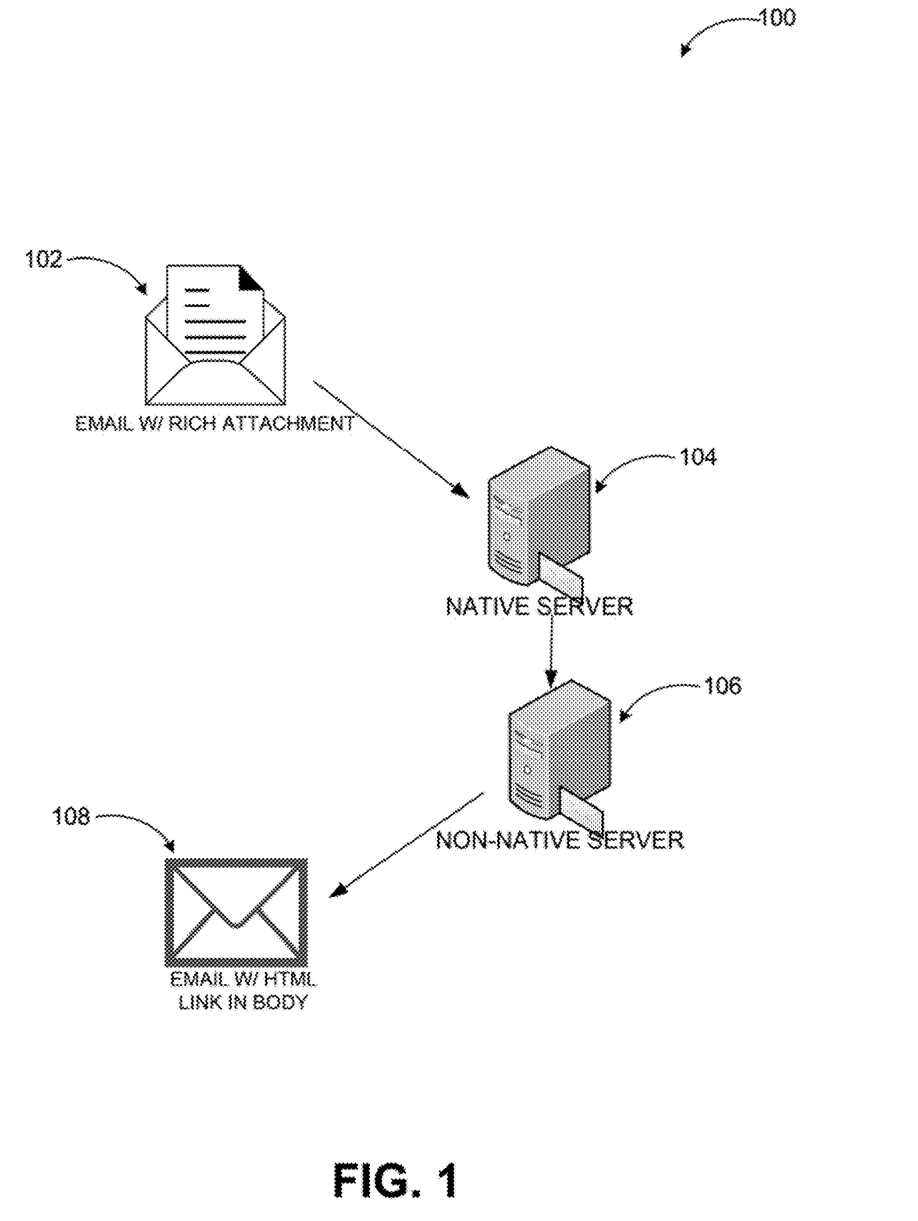
FIG. 1 illustrates an example flow of an email with a rich attachment to a system that is incapable of processing rich attachments.

FIG. 1 illustrates an example flow of an email with a rich attachment to a system that is incapable of processing rich attachments.

As illustrated in diagram 100, an email 102 may be generated with one or more rich attachments. Rich attachments may include features such as interactivity, preview, presence, dynamic content update, and other non-static capabilities. For example, a static image attached or inserted to an email may be a non-rich attachment. On the other hand, an image of a person with presence information about that person, or an image with interactive features (e.g., one that allows a user to select portions of the image and receive information associated with the selected portions) may be a rich attachment. Thus, if the email 102 is sent to a recipient within a system that is capable of processing the rich attachment(s) via native server 104, the recipient may be able to experience the rich capabilities as provided through their client application (local application or browser based application).

If the email 102 is sent to a system incapable of processing the rich attachment, however, the non-native server 106 of that system may simply render a link within the body of the email instead of presenting the rich attachment and associated features. Thus, a recipient in that system may receive email 108 with the link in its body. That recipient may have to activate the link, download one or more modules, switch to a web application, or perform other operations to experience the rich features. In some cases, the rich features may not be presentable to the recipient of the email 108 at all.

The rich attachment(s) may be included in the email 102 as a file or object attached to the email, inserted into a body of the email, included in an attachment well (a separate portion of the user interface displaying the email), or even provided as a link within the email (but presentable with the rich features).

Figure 2:
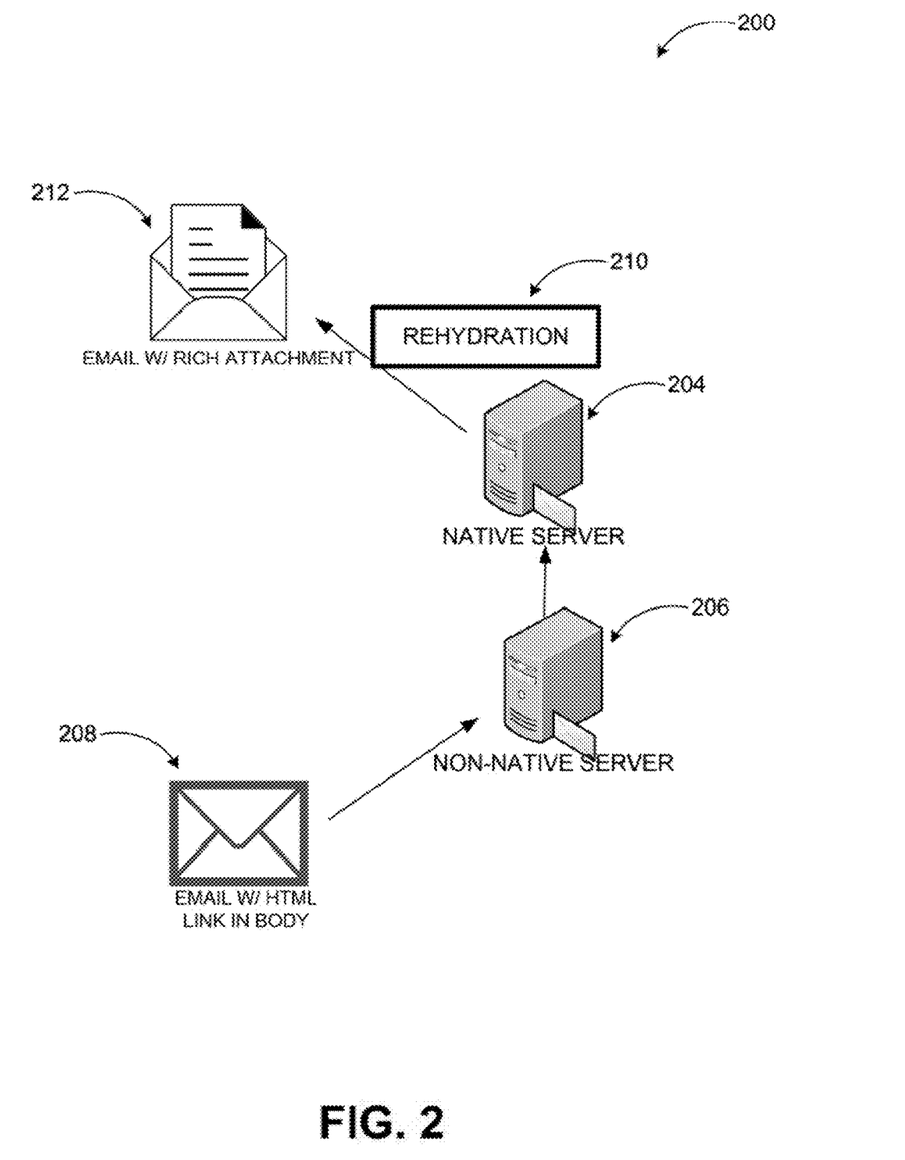
FIG. 2 illustrates an example flow of a return of an email that originally included a rich attachment to a system that is capable of processing rich attachments.

FIG. 2 illustrates an example flow of a return of an email that originally included a rich attachment to a system that is capable of processing rich attachments.

Diagram 200 illustrates regeneration of rich attachments upon return of an email with rich attachments to a system that is capable of processing rich attachments from a system without the rich attachment capability. In the example scenario, email 208 includes a link in its body to a rich attachment. The email may be originated in a system with rich attachment capabilities and sent to a recipient in the system with rich attachment capabilities through a forward or reply action. The recipient at the system with rich attachment capabilities may be the original sender or another recipient. The email may have been generated in a different system too. For example, a sender in a first system capable of processing rich attachments may generate an email with rich attachment(s) and send to a recipient in a second system without rich attachment capabilities. That recipient may receive the attachment in form of a link within the email and forward the email to another recipient in a third system with rich attachment capabilities. Thus, the other recipient may receive and experience the rich attachment(s) as if he/she were in the first system, where the email originated.

In the shown scenario, email 208 may be forwarded by non-native server 206 to the native server 204, where the rich attachment(s) may be regenerated (or rehydrated) (210) before the email is presented to its recipient as an email with rich attachment 212.

Figure 3:
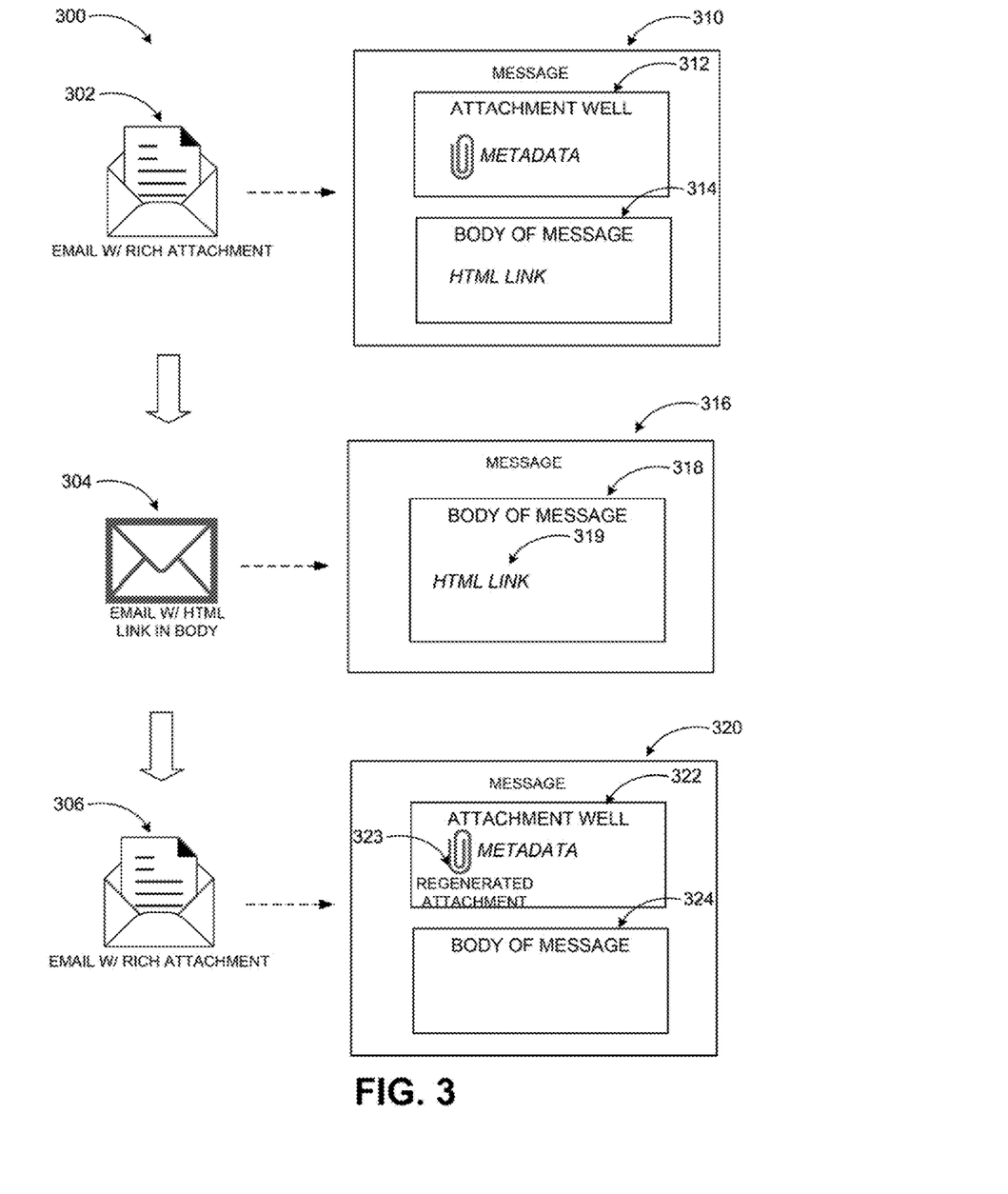
FIG. 3 illustrates conceptually treatment of a rich attachment when an email containing the rich attachment is exchanged between its native system and a non-native system that is incapable of processing rich attachments.

FIG. 3 illustrates conceptually treatment of a rich attachment when an email containing the rich attachment is exchanged between its native system and a non-native system that is incapable of processing rich attachments.

As discussed above, when a server incapable of handling rich attachments receives an email or comparable communication with rich attachment (e.g., cloud-based file, live metadata, etc.), it may just render a link (e.g., HTML link) within the body of the communication that is included by the native server along with the rich attachment. Thus, when the communication is forwarded by the non-native server, the rich attachment may be stripped, but the link may be persisted in the forwarded (or replied) communication. When the same communication is received at a server capable of handling rich attachments as a result of a forward or a reply action, the receiving server may recognize the HTML link, extract the data from the link, and place the attachment in the attachment well optionally adding the original metadata, live or not. In some embodiments, the live metadata may be removed (e.g., kept static) or revived (dynamic). The server or, alternatively, a module at the server, a module at the client device, a thick client may perform the regeneration or rehydration upon receiving the email from the server incapable of handling rich attachments. In a conversation of multiple messages, a link from the last message may be rehydrated. Alternatively, a latest version of the linked attachment may be rehydrated. User permissions may be taken into consideration when placing the attachment into the attachment well. For example, original permissions may be respected, permissions may be adjusted based on recipient's credentials, etc.

Diagram 300 shows an email 302 with a rich attachment transformed into an email 304 with just a link in its body, and rehydrated back to an email 306 with a rich attachment. As discussed above, the regenerated attachment in email 306 may not be the same as the attachment in email 302. For example, the regeneration process may retrieve a latest version of the attached file or object, thus the attachment may have changed. Moreover, the attachment may include live metadata, which may also change in the process.

In some embodiments, the email 302 may be presented as message 310 that includes an attachment well 312 (to display rich attachments with their features such as preview, live metadata, etc.) and a body of the message 314, which may include textual, graphical, or comparable content. In some examples, the attachment may be displayed within the body of the message 314 as well.

Upon being processed by a server incapable of processing rich attachments, the email 304 may be displayed as message 316 with just a body of the message 318. A static link 319 to the attachment may be provided within the body. Following the regeneration process by another server capable of processing rich attachments, email 306 may be displayed similar to the email 302 as message 320 with an attachment well 322 and body of the message 324. The regenerated attachment 323 may be presented in the attachment well 322 or in the body of the message 324.

The examples provided in FIGS. 1 through 3 are illustrated with specific services, devices, applications, modules, module components, and configurations. Embodiments are not limited to environments according to these examples. Rich attachment regeneration may be implemented in environments employing fewer or additional services, devices, applications, modules, module components, and configurations. Furthermore, the example services, devices, applications, modules, module components, and configurations shown in FIG. 1 through 3 may be implemented in a similar manner with other values using the principles described herein.

Figure 4:
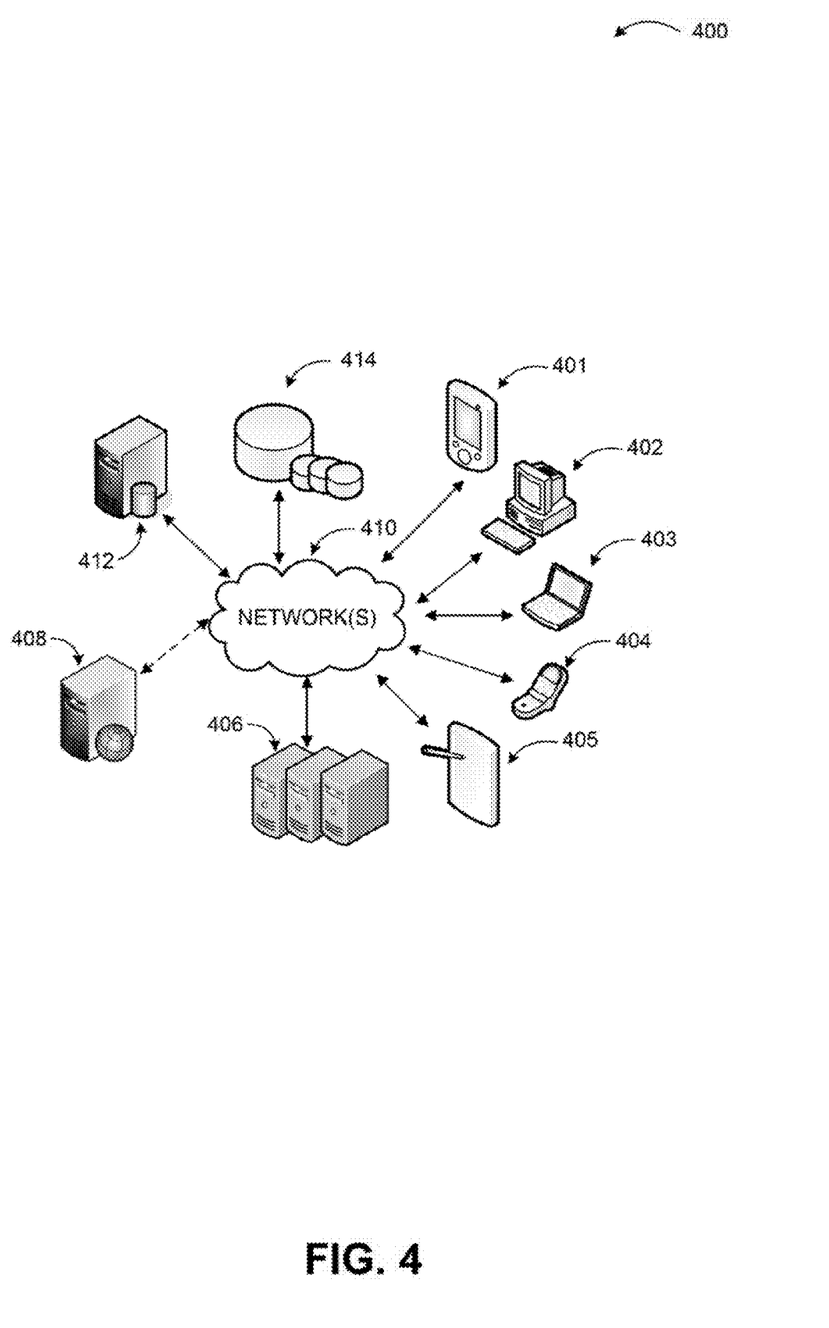
FIG. 4 is a networked environment, where a system according to embodiments may be implemented.

FIG. 4 is a networked environment, where a system according to embodiments may be implemented. As shown in a diagram 400, rich attachments in emails (or other modes of communication) may be sent with a link in addition to the rich attachment and regenerated when an email with a rich attachment is sent to an application incapable of handling the rich attachment and then returned or forwarded to an application capable of handling the rich attachments. An example communication application or service with rich attachment regeneration capability may be implemented via software executed over one or more servers 406 or individual server 408. The communication application or service may communicate with client applications on individual computing devices such as a handheld computer 401, a desktop computer 402, a laptop computer 403, a smart phone 404, a tablet computer (or slate), 405 ('client devices') through network(s) 410 and control exchange of communications such as emails.

Client devices 401-405 are used to access the functionality provided by the communication service or application. One or more of the servers 406 or server 408 may be used to provide a variety of services associated with processing rich attachments as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide rich attachment regeneration. Furthermore, the networked environments discussed in FIG. 4 are for illustration purposes only. Embodiments are not limited to the example applications, modules, or processes.

Figure 5:
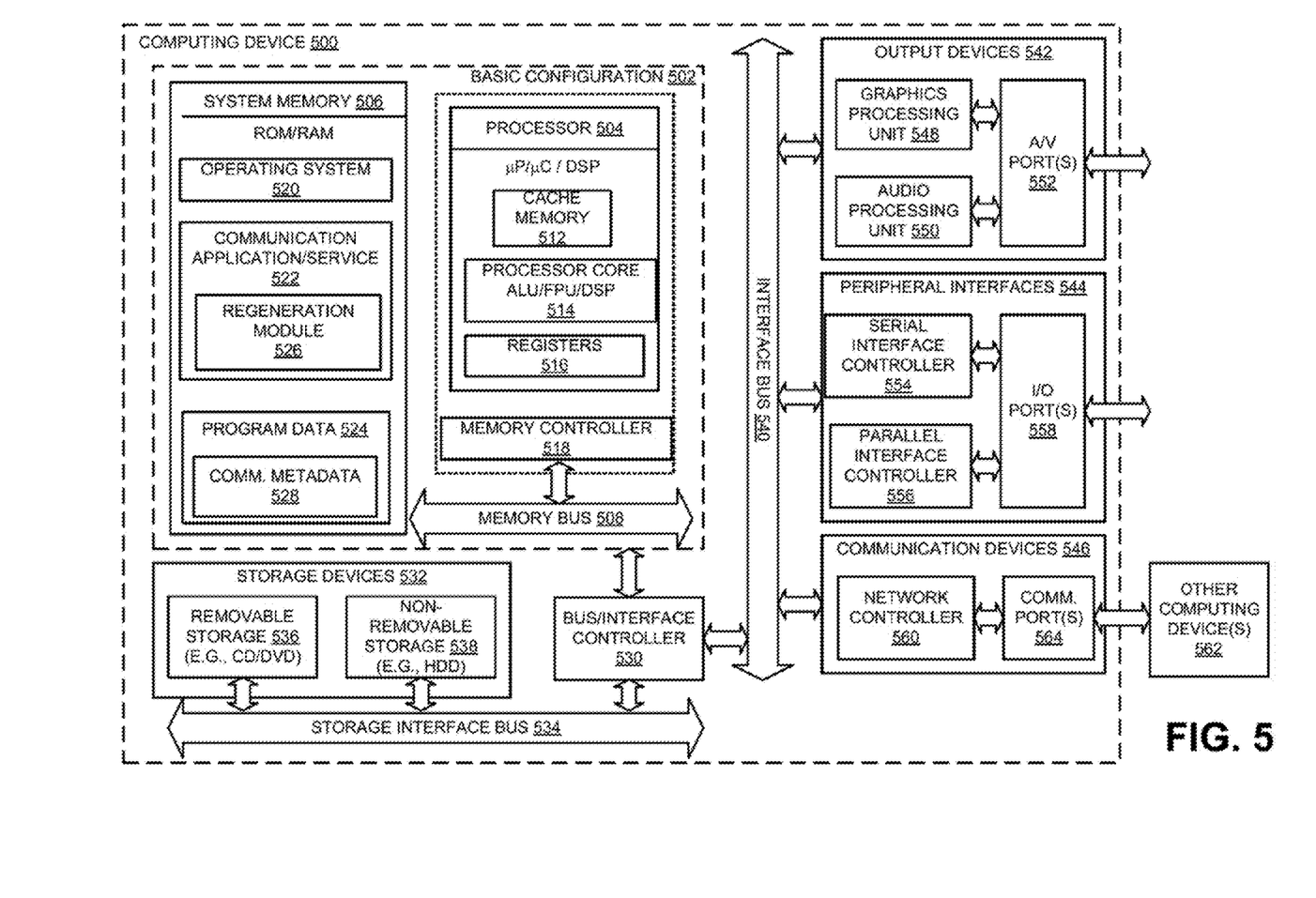
FIG. 5 is a block diagram of an example general purpose computing device, which may be used to provide rich attachment regeneration.

FIG. 5 and the associated discussion are intended to provide a brief, general description of a general purpose computing device, which may be used to provide rich attachment regeneration.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (MP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication application/service 522, a regeneration module 526, and program data 524. The program data 524 may include, among other data, attachment metadata 528, as disclosed herein. The regeneration (or rehydration) module 526 may, in conjunction with the communication application/service 522, recognize a link that represents an attachment in a communication received from a communication application not capable of handling rich attachments and regenerate the attachment with rich attributes such as live metadata and include in the communication before presentation to a user.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide rich attachment regeneration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
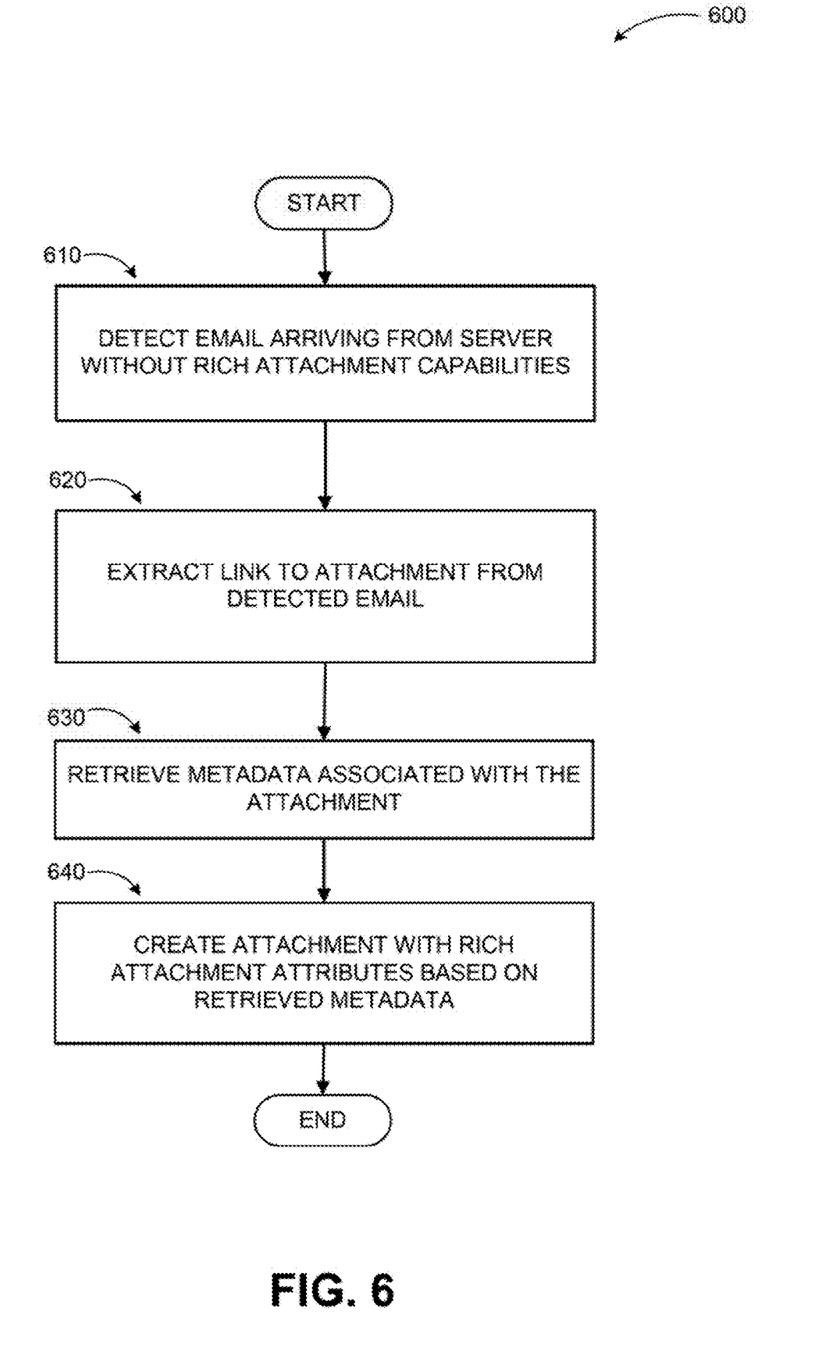
FIG. 6 illustrates a logic flow diagram of a method to provide rich attachment regeneration, according to embodiments.

FIG. 6 illustrates a logic flow diagram for process 600 of a method to provide rich attachment regeneration, according to embodiments. Process 600 may be implemented on a server or other system. An example system may include a communication service that manages various communication modes such as emails. The system may be capable of processing attachments with rich capabilities as described herein.

Process 600 begins with operation 610, where an email arriving from a server without rich attachment processing capabilities (non-native) may be detected. The email may originate in the system of the non-native server or originate in a system with rich attachment capabilities and be forwarded or sent as a reply from the system of the non-native server. At operation 620, a link to a rich attachment may be extracted from a body of the arriving email. Systems incapable of processing rich attachments may convert those into links within a body of an email. Thus, if the email originates from a system capable of processing rich attachments and includes a link in its body, the link may be associated with a rich attachment.

At operation 630, metadata associated with the attachment may be retrieved by analyzing the link, gathering information associated with the attachment through the link, etc. Subsequently at operation 640, an attachment with rich attachment features may be created based on the retrieved metadata and attached to the email (e.g., in an attachment well) for presentation to a recipient.

The operations included in process 600 are for illustration purposes. Rich attachment regeneration may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing regeneration of rich attachments in an email is described. The means may include detecting, at a first server with rich attachment capabilities, the email arriving from a second server without rich attachment capabilities; a means for extracting a link to an attachment from a body of the detected email; a means for retrieving metadata associated with the attachment; and a means for regenerating the attachment with rich attachment attributes based on the retrieved metadata.

According to some examples, a computing device to provide regeneration of rich attachments may be described. The computing device may include a memory configured to store instructions and one or more processors coupled to the memory, the one or more processors configured to execute, in conjunction with the instructions stored in the memory, a communication service. The communication service may include a communication exchange module configured to receive a communication arriving from a server without rich attachment capabilities and a regeneration module. The regeneration module may be configured to extract a link to an attachment from a body of the received communication; retrieve metadata associated with the attachment; regenerate the attachment with rich attachment attributes based on the retrieved metadata; and provide the communication with the regenerated attachment to a recipient.

According to other examples, the regeneration module may be further configured to recognize the link as belonging to an attachment. The link may be a hypertext markup language "HTML" link. The regeneration module may be further configured to place the attachment in an attachment well on a user interface displaying the communication. The regeneration module may be further configured to add original metadata associated with the received communication. The original metadata may be live metadata. The rich attachment may be one of a locally stored file, an object, and a cloud-based file. The communication may be a conversation of multiple messages, and the regeneration module may be further configured to regenerate an attachment associated with a link in a last message within the conversation.

According to further examples, the regeneration module may be further configured to regenerate a latest version of the attachment associated with the link. The rich attachment attributes may include one or more of an interactivity, a preview capability, a presence information, a dynamic content update, and live metadata. The regeneration module may be configured to retrieve the metadata associated with the attachment by one or more of analyzing the link and gathering information associated with the attachment through the link. The communication may be one of an email, an instant message, an online conference recording, a data sharing session, and an application sharing session.

According to other examples, a method executed on a computing device to provide regeneration of rich attachments in an email is described. The method may include detecting, at a first server with rich attachment capabilities, the email arriving from a second server without rich attachment capabilities; extracting a link to an attachment from a body of the detected email; retrieving metadata associated with the attachment; and regenerating the attachment with rich attachment attributes based on the retrieved metadata.

According to some examples, the email may originate from a third server with rich attachment capabilities and may be received at the first server as a result of one of a forward action and a reply action. The first server and the third server may be part of different email service systems. The method may further include extracting the link, retrieving the metadata, and regenerating the attachment at one or more of a module of the first server, a module of a client device communicatively coupled to the first server, and an email application executed on the client device communicatively coupled to the first server. The method may further include regenerating the attachment based on one or more user permissions. Regenerating the attachment based on one or more user permissions may include one of respecting permissions set by an original sender of the email, respecting permissions set by a last sender of the email, and adjusting permissions based on a credential of a recipient of the email.

According to further examples, a computer readable memory device with instructions stored thereon to provide regeneration of rich attachments in an email. The instructions may include detecting the email arriving without rich attachment capabilities through one of a forward action and a reply action; recognizing a link in a body of the email as belonging to an attachment; extracting the link from the body of the detected email; retrieving metadata associated with the attachment; regenerating the attachment with rich attachment attributes based on the retrieved metadata; and placing the regenerated attachment in an attachment well on a user interface displaying the email.

According to yet other examples, the rich attachment may be one of a locally stored file, an object, and a cloud-based file, and the rich attachment attributes may include one or more of an interactivity, a preview capability, a presence information, a dynamic content update, and live metadata.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide regeneration of rich attachments, the computing device comprising:
a memory configured to store instructions; and
one or more processors coupled to the memory, the one or more processors configured to execute, in conjunction with the instructions stored in the memory, a communication service, wherein the communication service comprises:
a communication exchange module configured to detect a communication originating at a first server with rich attachment capabilities that was received and subsequently transmitted by a second server without rich attachment capabilities to the communication service, wherein the communication is part of a conversation of multiple communications, a body of the transmitted communication comprises a link to an attachment, and the attachment was previously a rich attachment of the communication originating at the first server; and
a regeneration module configured to:
extract the link to the attachment from the body of the transmitted communication;
retrieve metadata associated with the attachment through the link;
regenerate the attachment associated with the link in a last communication of the conversation with rich attachment attributes based on the retrieved metadata such that the regenerated attachment has same features of the rich attachment of the communication originating at the first server, wherein a latest version of the attachment associated with the link is regenerated;
define permissions of the regenerated attachment based on permissions set by a first sender and a last sender of the transmitted communication; and
provide the transmitted communication with the regenerated attachment to the recipient.

2. The computing device of claim 1, wherein the regeneration module is further configured to recognize the link as belonging to the attachment.

3. The computing device of claim 2, wherein the link is a hypertext markup language "HTML" link.

4. The computing device of claim 1, wherein the regeneration module is further configured to place the attachment in an attachment well on a user interface displaying the transmitted communication.

5. The computing device of claim 1, wherein the regeneration module is further configured to add, to the transmitted communication, original metadata associated with the communication originating at the first server.

6. The computing device of claim 5, wherein the original metadata is live metadata.

7. The computing device of claim 1, wherein the rich attachment is one of a locally stored file, an object, and a cloud-based file.

8. The computing device of claim 1, wherein the rich attachment attributes include one or more of an interactivity, a preview capability, a presence information, a dynamic content update, and live metadata.

9. The computing device of claim 1, wherein the regeneration module is configured to retrieve the metadata associated with the attachment through the link by one or more of analyzing the link and gathering information associated with the attachment through the link.

10. The computing device of claim 1, wherein the transmitted communication is one of an email, an instant message, an online conference recording, a data sharing session, and an application sharing session.

11. A method executed on a computing device to provide regeneration of rich attachments in an email, the method comprising:
detecting, at a first server with rich attachment capabilities, the email transmitted by a second server without rich attachment capabilities, wherein the email is part of a conversation of multiple emails, a body of the transmitted email comprises a link to an attachment, and the attachment was previously a rich attachment of the email that originated at a third server with rich attachment capabilities before the email was received at and subsequently transmitted by the second server to the first server;
extracting the link to the attachment from the body of the transmitted email;
retrieving metadata associated with the attachment through the link;
regenerating the attachment associated with the link in a last email of the conversation with rich attachment attributes based on the retrieved metadata such that the regenerated attachment has same features of the rich attachment of the email that originated at the third server, wherein a latest version of the attachment associated with the link is regenerated; and
defining permissions of the regenerated attachment based on permissions set by a first sender and a last sender of the transmitted email.

12. The method of claim 11, wherein the transmitted email is detected at the first server as a result of one of a forward action and a reply action selected for the email at the second server.

13. The method of claim 11, wherein the first server and the third server are part of different email service systems.

14. The method of claim 11, further comprising extracting the link, retrieving the metadata, and regenerating the attachment at one or more of a module of the first server, a module of a client device communicatively coupled to the first server, and an email application executed on the client device communicatively coupled to the first server.

15. A computer readable memory device with instructions stored thereon to provide regeneration of rich attachments in an email, the instructions comprising:
at a first server with rich attachment capabilities:
detecting the email transmitted by a second server without rich attachment capabilities through one of a forward action and a reply action, wherein the email is part of a conversation of multiple emails, a body of the transmitted email comprises a link to an attachment, and the attachment was previously a rich attachment of the email that originated at a third server with rich attachment capabilities before the email was received at and subsequently transmitted by the second server to the first server;

recognizing the link in the body of the email as belonging to the attachment;

extracting the link from the body of the transmitted email;

retrieving metadata associated with the attachment through the link;

regenerating the attachment associated with the link in a last email of the conversation with rich attachment attributes based on the retrieved metadata such that the regenerated attachment has same features of the rich attachment of the communication that originated at the third server, wherein a latest version of the attachment associated with the link is regenerated;

defining permissions of the regenerated attachment based on permissions set by a first sender and a last sender of the transmitted email; and placing the regenerated attachment in an attachment well on a user interface displaying the transmitted email.

16. The computer readable memory device of claim 15, wherein the rich attachment is one of a locally stored file, an object, and a cloud-based file, and the rich attachment attributes include one or more of an interactivity, a preview capability, a presence information, a dynamic content update, and live metadata.

* * * * *